US012318693B2

(12) United States Patent
Taylor et al.

(10) Patent No.: US 12,318,693 B2
(45) Date of Patent: Jun. 3, 2025

(54) USE OF MACHINE LEARNING TO TRANSFORM SCREEN RENDERS FROM THE PLAYER VIEWPOINT

(71) Applicant: Sony Interactive Entertainment Inc., Tokyo (JP)

(72) Inventors: Michael Taylor, San Mateo, CA (US); Glenn Black, San Mateo, CA (US); Celeste Bean, San Mateo, CA (US); Sergey Bashkirov, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 102 days.

(21) Appl. No.: 17/810,556

(22) Filed: Jul. 1, 2022

(65) Prior Publication Data
US 2024/0001239 A1    Jan. 4, 2024

(51) Int. Cl.
*A63F 13/57* (2014.01)
*G06N 20/00* (2019.01)
*G06T 15/20* (2011.01)

(52) U.S. Cl.
CPC ............ *A63F 13/57* (2014.09); *G06N 20/00* (2019.01); *G06T 15/20* (2013.01)

(58) Field of Classification Search
CPC .......... A63F 13/57; G06N 20/00; G06T 15/20
See application file for complete search history.

(56) References Cited

U.S. PATENT DOCUMENTS

| 8,337,312 | B1 * | 12/2012 | Jones ...................... A63F 13/65 |
| | | | 463/31 |
| 8,506,398 | B2 * | 8/2013 | Shimizu ................ A63F 13/798 |
| | | | 273/317.1 |
| 11,229,840 | B2 * | 1/2022 | Guo .......................... A63F 13/55 |
| 2017/0001111 | A1 * | 1/2017 | Willette .................. A63F 13/49 |
| 2020/0306638 | A1 * | 10/2020 | Fear .......................... A63F 13/67 |
| 2021/0031115 | A1 * | 2/2021 | McCoy .................... A63F 13/67 |
| 2021/0077904 | A1 | 3/2021 | Yen |

(Continued)

OTHER PUBLICATIONS

"International Search Report and Written Opinion", dated Sep. 29, 2023, from the counterpart PCT application PCT/US23/068707.

(Continued)

*Primary Examiner* — William H McCulloch, Jr.
*Assistant Examiner* — Ankit B Doshi
(74) *Attorney, Agent, or Firm* — Fish & Richardson P.C.

(57) ABSTRACT

Machine learning is used to transform screen renders from the viewpoint of the player's character to be from the viewpoint of other non-player characters (NPC) in the room. One or more neural networks are trained using game images captured during a human play session, and then subsequently the neural networks are used to create realistic video from the NPC viewpoints. To avoid rendering multiple viewpoints simultaneously, a single viewpoint is rendered, and neural networks are used to transform it for the viewpoints of other NPCs in the area. A group of NPCs may be treated as a batch and a single viewpoint transformed to multiple viewpoints in a single inference pass. For cloud gaming the game video can be rendered/sent immediately for the player but the actions of the NPCs are delayed for a frame while the neural network generates the behavior.

20 Claims, 7 Drawing Sheets

(56) References Cited

U.S. PATENT DOCUMENTS

| | | | |
|---|---|---|---|
| 2021/0082255 A1 | 3/2021 | Pierce et al. | |
| 2021/0299575 A1* | 9/2021 | Stafford et al. | |
| 2021/0299580 A1* | 9/2021 | Chow | A63F 13/5375 |
| 2021/0370186 A1* | 12/2021 | Ye | A63F 13/525 |
| 2022/0370908 A1* | 11/2022 | Kipnis | A63F 13/67 |
| 2023/0056715 A1* | 2/2023 | Côté | G06N 20/00 |
| 2023/0215083 A1* | 7/2023 | Hoffman-John | G06T 15/50 |
| | | | 345/419 |

OTHER PUBLICATIONS

International Preliminary Report on Patentability in International Appln. No. PCT/US2023/068707, mailed on Dec. 18, 2024, 8 pages.

* cited by examiner

USE OF MACHINE LEARNING TO TRANSFORM SCREEN RENDERS FROM THE PLAYER VIEWPOINT

FIELD

The present application relates generally to the use of machine learning to transform screen renders from the player viewpoint.

BACKGROUND

As understood herein, training data for artificial intelligence (AI) agents whose goal is to mimic human behavior is typically captured from human play sessions. The viewpoint of such play sessions is typically that of the human controlled player character. In order to enable agents trained in this manner to choose actions at runtime, they must receive input similar in nature to that of which they were trained. However, since at runtime the game scene is rendered from the perspective of the player character, the rendered view cannot be used by an agent controlling a non-player character (NPC) to choose actions for the NPC.

As further understood herein, AI agents typically receive, as input, video within the game to output NPC action. Because the game usually renders video from the viewpoint of the player character, the AI agents controlling NPCs may receive video from that viewpoint instead of from the viewpoints of the NPCs being controlled, which can reduce the effectiveness of the AI agents.

SUMMARY

Accordingly, machine learning is used to transform screen renders from the viewpoint of the player's character to be from the viewpoint of other non-player characters (NPC) in the game. One or more neural networks are trained using game images captured during a human play session, and then subsequently the neural networks are used to create realistic video from the NPC viewpoints that may be input to an NPC control agent or viewed by, for instance, a spectator wishing to see the game from the viewpoint of a NPC.

While the game engine may be used to generate multiple video streams, i.e., one from the player character viewpoint and others from the viewpoints of NPCs, as recognized herein, this can be computationally expensive.

To avoid rendering multiple viewpoints simultaneously, a single video (e.g., from the player character viewpoint) can rendered and neural networks are used to transform it for the viewpoints of other NPCs in the area. A group of NPCs may be treated as a batch and a single viewpoint transformed to multiple viewpoints in a single inference pass. For cloud gaming the game video can be rendered/sent immediately for the player but the actions of the NPCs are delayed for a frame while the neural network generates the behavior.

If desired, when rendering the transformed views, information can be removed from them to change the decision making and actions of the NPCs to simulate NPCs with, for example, poor hearing. By randomizing the reduced information, the actions taken by the NPCs can be randomized.

Accordingly, an apparatus includes at least one computer storage that is not a transitory signal and that in turn includes instructions executable by at least one processor to generate a first screen render from a first viewpoint. The first viewpoint is of a first character that is a player's character. The instructions are executable to input the first screen render to at least one machine learning (ML) model and receive from the ML model at least one transform of the first screen render. The transform includes at least a second screen render from a second viewpoint which is that of a non-player character (NPC). The instructions are executable to input the second viewpoint to a machine learning (ML)-implemented agent controlling the NPC, and/or to present on at least one display the second screen render.

In some embodiments the first and second screen renders include respective first and second game videos. If desired, the ML model can be trained using game images captured during a human play session.

In non-limiting implementations the instructions are executable to avoid rendering multiple viewpoints simultaneously at least in part by rendering a single viewpoint, and using the ML model, transforming the single viewpoint to output video at viewpoints of one or more other NPCs in the area in a single inference pass.

In example embodiments the first screen render is sent from a cloud server to at least one display for presentation of the first screen render at a first time and actions of NPCs are delayed for at least one frame while the ML model generates the second screen render.

In another aspect, a method includes inputting, to at least one machine learning (ML) model, at least a player character (PC) video stream of at least one computer simulation. The method further includes receiving, from the ML model, at least one non-player character (NPC) video stream for the computer simulation. The method also includes presenting the PC video stream on at least one video display and using the NPC video stream to control an NPC.

In another aspect, an apparatus includes at least one processor configured to generate, using computer simulation video techniques, a first video from a viewpoint of a first character controllable by a player. The processor is configured to present the first video on at least one display and also to input the first video to at least one machine learning (ML) model. The processor further is configured to receive from the ML model at least a second video from a viewpoint of a second character not controllable by a player, and use the second video for controlling the second player by a ML-implemented agent.

The details of the present application, both as to its structure and operation, can be best understood in reference to the accompanying drawings, in which like reference numerals refer to like parts, and in which:

DETAILED DESCRIPTION

Figure 1:
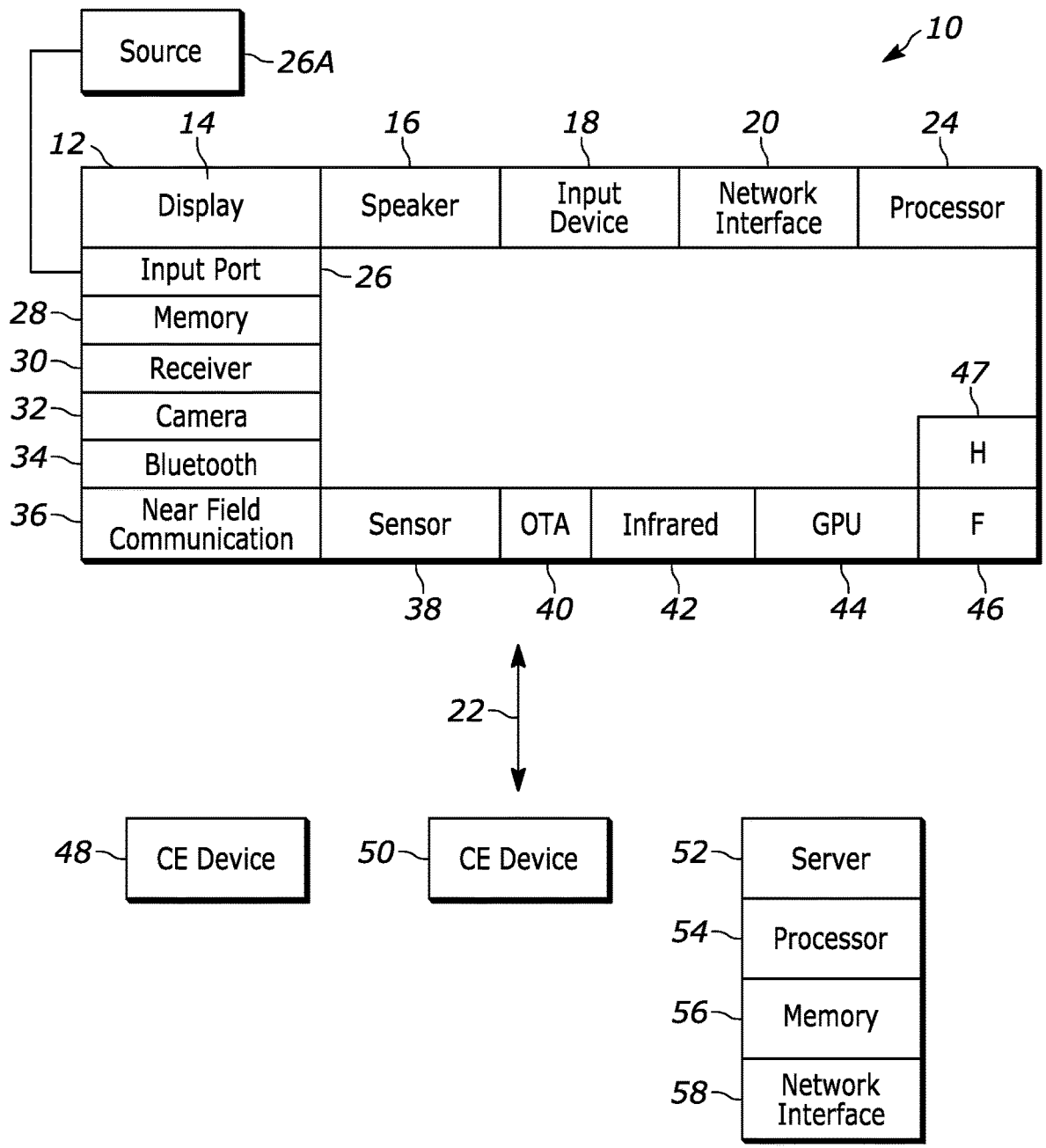
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server.

Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of motion sensors such as accelerometers, gyroscopes, and magnetometers to determine the location and orientation of the AVD 12 in three dimension or by an event-based sensor such as an event detection sensor (EDS) outputting binary indications of change in direction of a parameter.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12 and/or CE devices. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
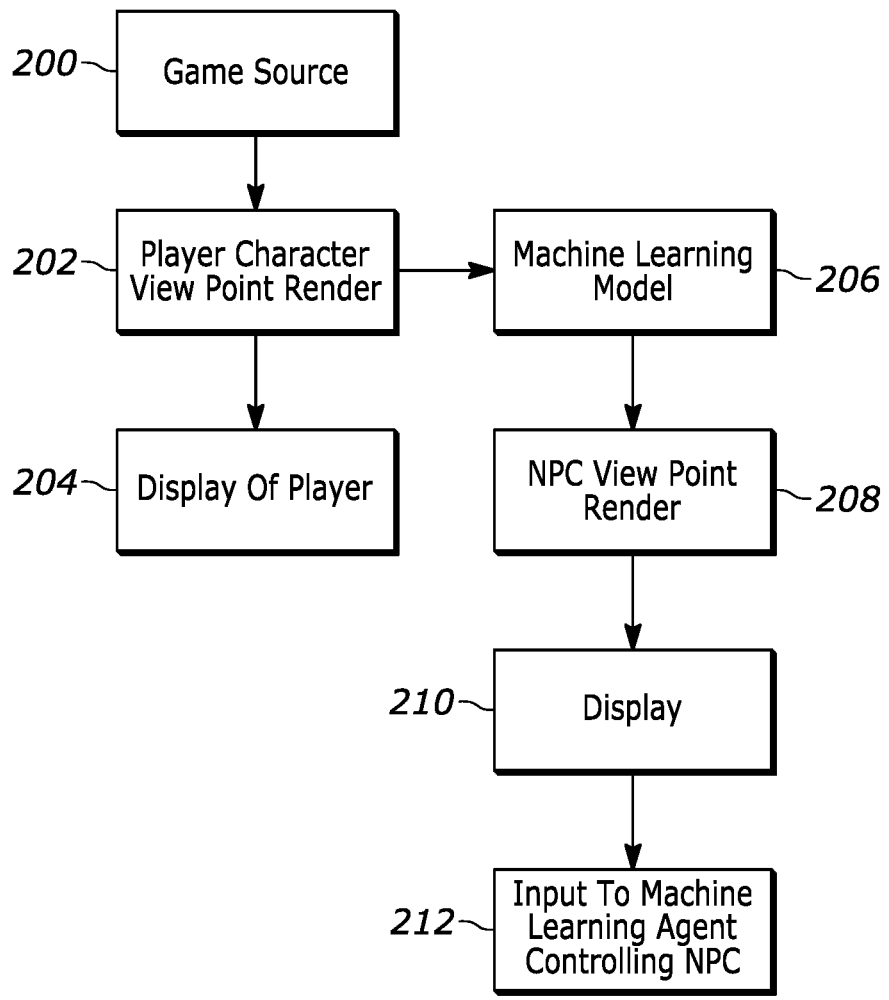
FIG. 2 illustrates an example block diagram of an example overall system architecture.

Refer now to FIG. 2. A source 200 of computer simulations such as computer games provides computer simulation video 202 that is rendered from the viewpoint of a simulation character of a player, i.e., a character being controlled by the player using, for instance, a computer game controller. The source 200 may be a local computer game console, a remote cloud server, or other computing device. The screen rendering in the video 202 from the source 200 is presented on a display 204 of the player.

The screen rendering in the video 202 from the source 200 also is provided to at least one machine learning (ML) model 206, which generates one or more videos 208 from the point(s) of view of non-player characters (NPC) in the computer simulation, i.e., characters who are not controlled by the player operating a computer simulation controller. These one or more NPC views can be used for one or more purposes.

For example, the one or more NPC views can be presented on respective displays 210, e.g., for spectators to view game play. In addition, or alternatively, an NPC view can be input at block 212 to an ML-implemented agent that controls a NPC, to improve the performance of the agent in controlling the NPC on the basis of the video from the NPC viewpoint and thus better mimic how a human might act or control the NPC if located at the virtual location of the NPC in the game. Based on the input NPC viewpoint video, the ML-implemented agent outputs controls signals to move the NPC and execute various behaviors of the NPC.

Thus, unlike the computer simulation video 202 that is rendered from the viewpoint of a simulation character of a player, which can be generated using conventional computer simulation video processing components, the one or more videos 208 from the point(s) of view of NPCs are generated using machine learning without incurring the processing of generating additional videos using conventional computer simulation video processing components.

Figure 3:
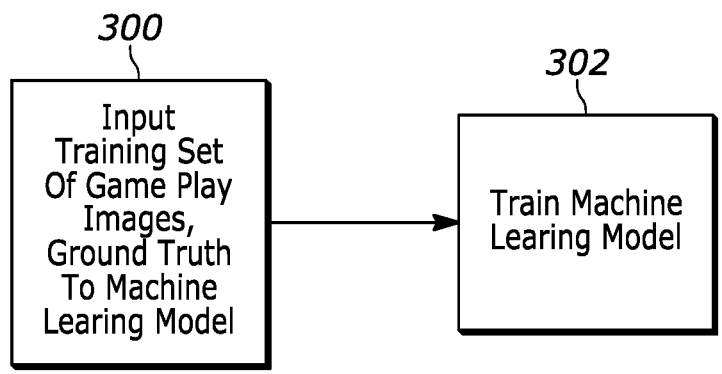
FIG. 3 illustrates example logic in example flow chart format for training one or more machine learning (ML) models to render NPC viewpoint videos.

FIG. 3 illustrates that to train the ML model 206 shown in FIG. 2, at block 300 a training set of game play images (e.g., from human game play video recordings and/or human game play metadata) and ground truth is input to the ML model at block 302. The training set may include rendered game play images from the viewpoint of player characters along with ground truth game play images of the same games from the viewpoints of NPCs, conventionally rendered, and if desired with geometric information indicating the ground truth geometric relationship within each game of the player character and NPCs associated with the game play images of the same games from the viewpoints of NPCs.

Figure 4:
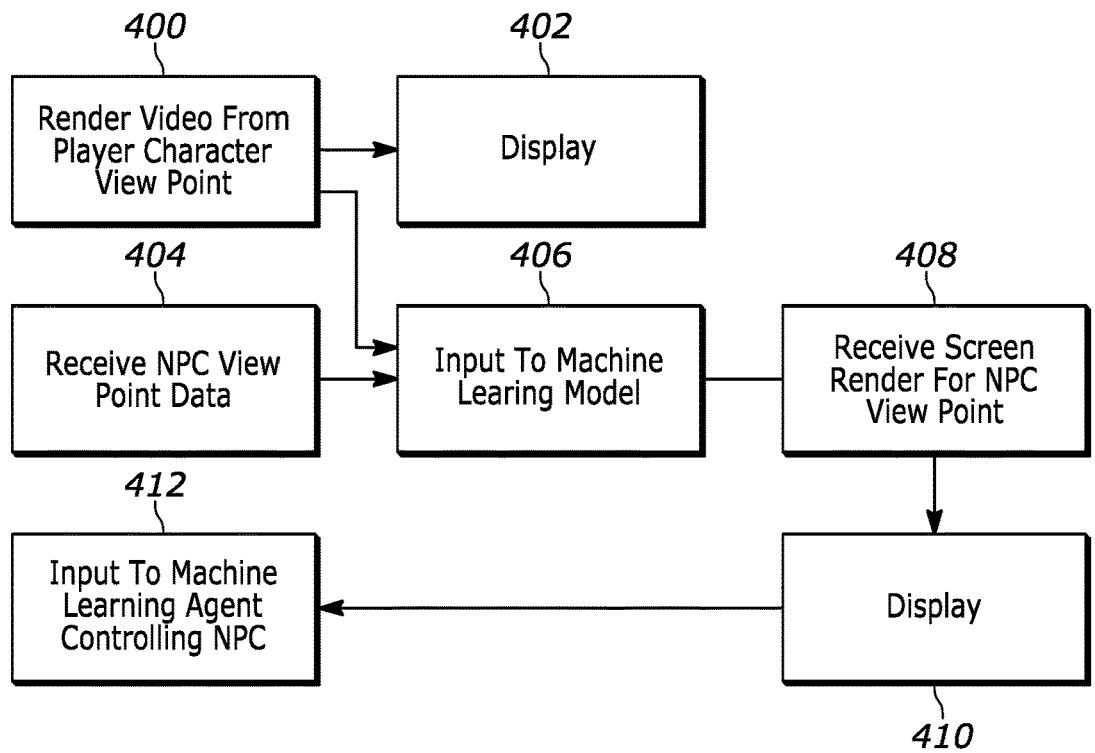
FIG. 4 illustrates example logic in example flow chart format for using the ML model(s) trained in FIG. 3 to produce game screen renders for one or more NPCs based on a single render for the player's character.

Subsequently, the trained ML model 206 is used as follows. The logic of FIG. 4 may be executed by any processor or combination of processors in any of the devices discussed herein. FIG. 4 illustrates that at block 400 video may be rendered from the viewpoint of the player character (PC) by, e.g., the source 200 shown in FIG. 2. Proceeding to block 402, the video from the PC viewpoint is rendered on a display, e.g., the player's display 204 shown in FIG. 2.

Also, at block 404 NPC viewpoint information is received. This information may represent the location and orientation of one or more NPCs and also the PC within the virtual world of the computer simulation for which PC viewpoint video is rendered at block 400, and may be identified in, e.g., metadata associated with the simulation. At block 406 the NPC viewpoint information from block 404 and the PC viewpoint screen render from block 400 are input to the ML model, e.g., the ML model 206 in FIG. 2 as trained according to FIG. 3. Block 408 indicates that in response, the logic receives back from the ML model screen renders from each viewpoint of each NPC whose data was received at block 404.

These NPC screen renders are displayed on, e.g., respective displays at block 410. In addition, or alternatively, an NPC screen render can be input at block 412 to an ML-implemented agent that controls a NPC, to improve the performance of the agent in controlling the NPC on the basis of the video from the NPC viewpoint and thus better mimic how a human might act or control the NPC if located at the virtual location of the NPC in the game. Based on the input NPC viewpoint video, the ML-implemented agent outputs controls signals to move the NPC and execute various behaviors of the NPC.

Figure 5:
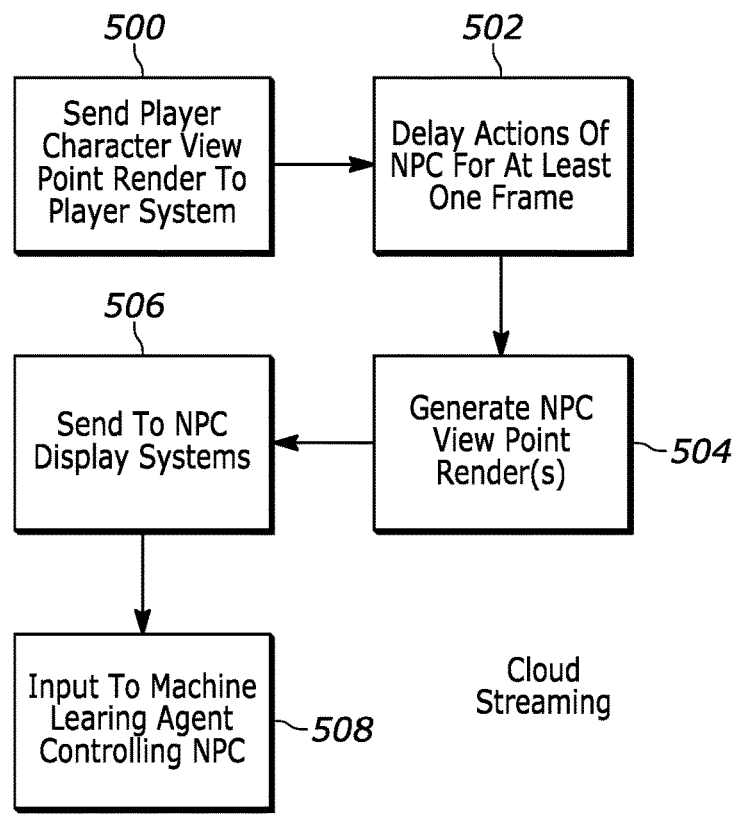
FIG. 5 illustrates example logic in example flow chart format for a cloud-based use case.

FIG. 5 illustrates a use case for cloud streaming of computer simulations, for example when the source 200 shown in FIG. 2 is a cloud-based game server. Commencing at block 500, the PC viewpoint screen rendering is sent to the player's game system for display thereof. Moving to block 502, the actions of NPCs within the simulation may be delayed, e.g., by at least one video frame, and the screen renders from the viewpoint(s) of the NPC(s) are generated at block 504.

At block 506 the NPC viewpoint screen renders may be sent to NPC display systems, such as the game systems of spectators and/or the player (for a picture-in-picture or side by side presentation of both the PC viewpoint and NPC viewpoint videos). In addition, or alternatively, an NPC viewpoint screen render can be input at block 506 to an ML-implemented agent that controls a NPC, to improve the performance of the agent in controlling the NPC on the basis of the video from the NPC viewpoint and thus better mimic how a human might act or control the NPC if located at the virtual location of the NPC in the game. Based on the input NPC viewpoint video, the ML-implemented agent outputs controls signals to move the NPC and execute various behaviors of the NPC.

Figure 6:
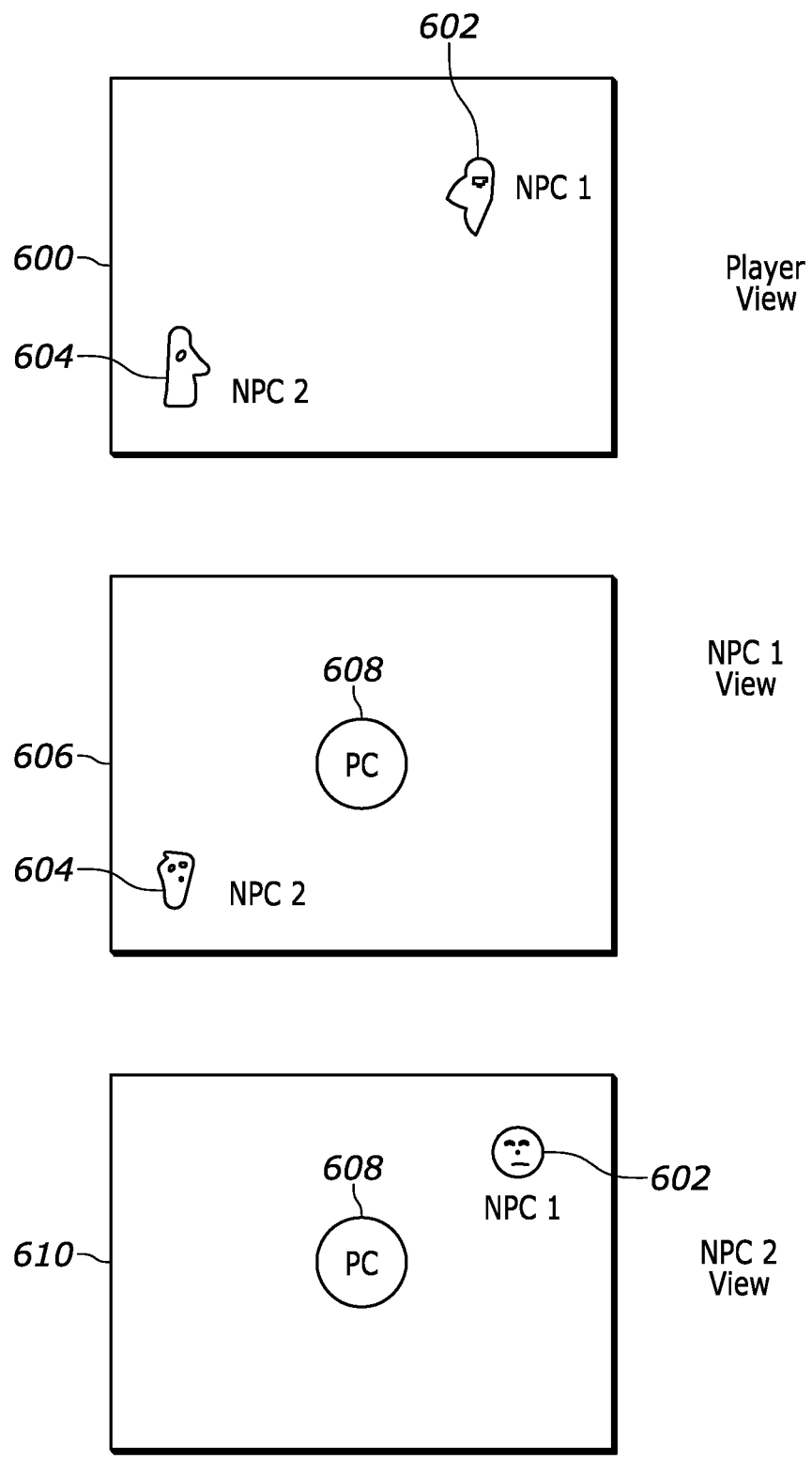
FIG. 6 illustrates an example schematic view of multiple screen renderings.

FIG. 6 illustrates further. A computer simulation from the perspective of the PC may be presented on a player display 600. The simulation in the non-limiting example shown shows first and second NPCs 602, 604, it being understood that fewer than two or greater than two NPCs may be implemented. Because the view on the display 600 is from the viewpoint of the PC, the PC is not shown.

A video of the simulation presented on the player display 600 also may be presented on a first NPC display 606, except from the viewpoint of the first NPC 602 as output by the ML model 206 in FIG. 2. Accordingly, the video on the first NPC display 606 shows the second NPC 604 and a PC 608. As discussed above, in addition or alternatively the viewpoint video of the first NPC 602 can be input to a ML-implemented agent controlling the first NPC.

Furthermore, a video of the simulation presented on the player display 600 also may be presented on a second NPC display 610, except from the viewpoint of the second NPC 604 as output by the ML model 206 in FIG. 2. Accordingly, the video on the second NPC display 610 shows the first NPC 602 and the PC 608. As discussed above, in addition or alternatively the viewpoint video of the second NPC 604 can be input to a ML-implemented agent controlling the second NPC.

Figure 7:
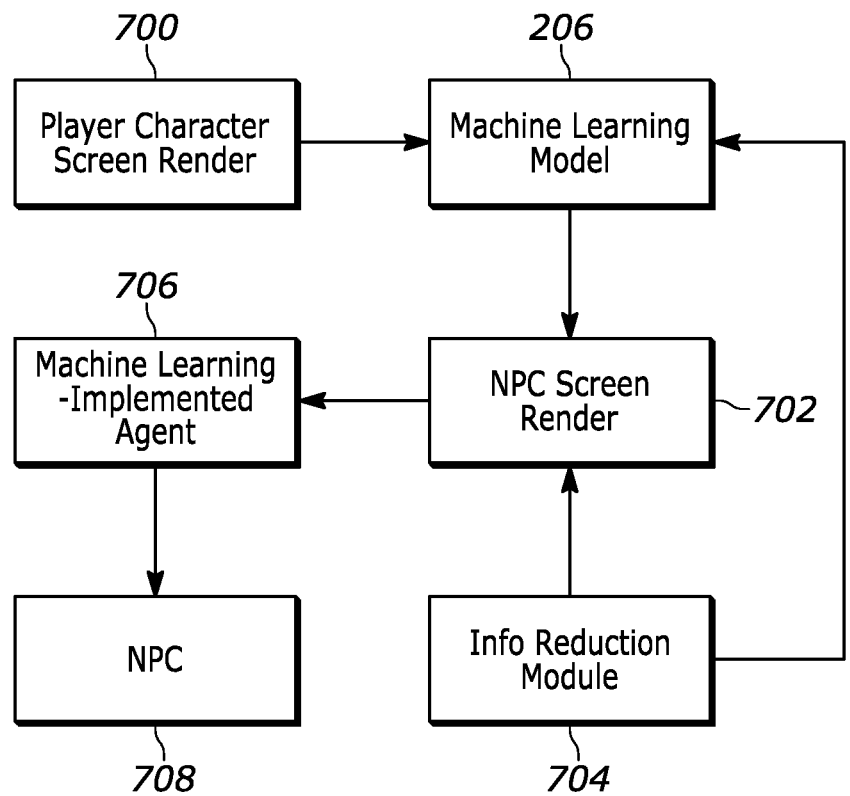
FIG. 7 illustrates an example architecture consistent with present principles.

FIG. 7 further illustrates principles discussed herein. A computer game engine produces a screen render 700 from the viewpoint of the player character. The screen render 700 is sent to the ML model 206, which generates at least one ML-generated screen render 702.

Information in the ML-generated screen render 702 may be deleted from the ML-generated screen render 702 or alternatively not generated by the ML model 206 in producing the ML-generated screen render 702 according to input from an information reduction module 704, which essentially acts as a filter to remove certain information from being used to control the NPC. For example, the module 704 may represent input commands from a game designer to prevent an NPC from seeing certain things, e.g., a specific color, to render the NPC color blind and thus alter the behavior of the NPC accordingly by not reacting to certain colors. Or, the information reduction module 704 may command that the NPC screen render 702 not contain audio, so that the NPC can be rendered as being deaf and thus not respond to audio such as loud sounds.

The NPC screen render 702 (absent any information as determined by the information reduction module 704) is provided to an ML-implemented agent 706 to control a NPC 708 based on the NPC screen render 702. It is to be understood that the ML-implemented agent 706 may be trained similarly to the ML model 206, e.g., using a training set of screen renders from human play at the viewpoint of the PC with annotated actions of the NPC when controlled by the human, including with missing information not being provided to the human as might be specified by the information reduction module 704.

Figure 8:
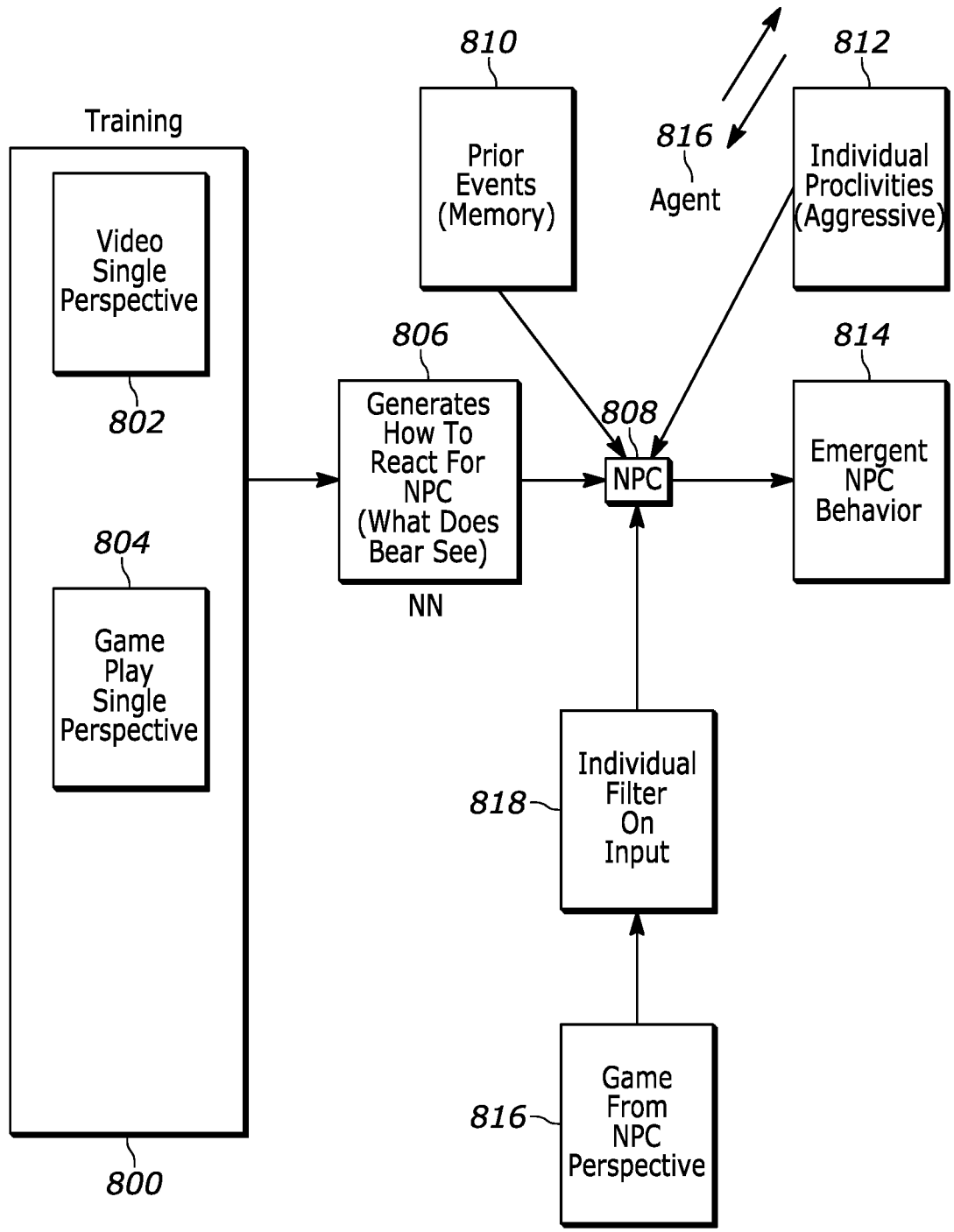
FIG. 8 further illustrates an architecture consistent with present principles.

FIG. 8 illustrates examples of the above. A training set 800 that may include video 802 from a single perspective (e.g., the player character) and game play information 804 from a single perspective (e.g., metadata related to the video 802) can be input to a machine learning block 804. The ML block 806 may be implemented by one or more neural networks. The ML block 806 generates information in response to the input as to the reactions of a character being controlled in the input data 800. For instance, if the character is a bear, the ML block 806 can generate information as to what objects in the game the bear was emulated to have seen.

The output of the ML block 806 subsequently can be used to control a NPC 808. The NPC 808 also may be controlled based on prior events 810 that occurred to the NPC 808 and based on emulated individual proclivities 812 of the NPC 808 such as an aggressive or passive nature to produce emergent behavior 814 of the NPC 808. A ML-implemented agent 816 may coordinate and/or execute one or more of the blocks shown in FIG. 8.

As discussed above, a screen render 816 of the game from the perspective of the NPC also is provided to control the NPC, filtered if desired of specified information at block 818 according to the information reduction module in FIG. 7.

Figure 9:
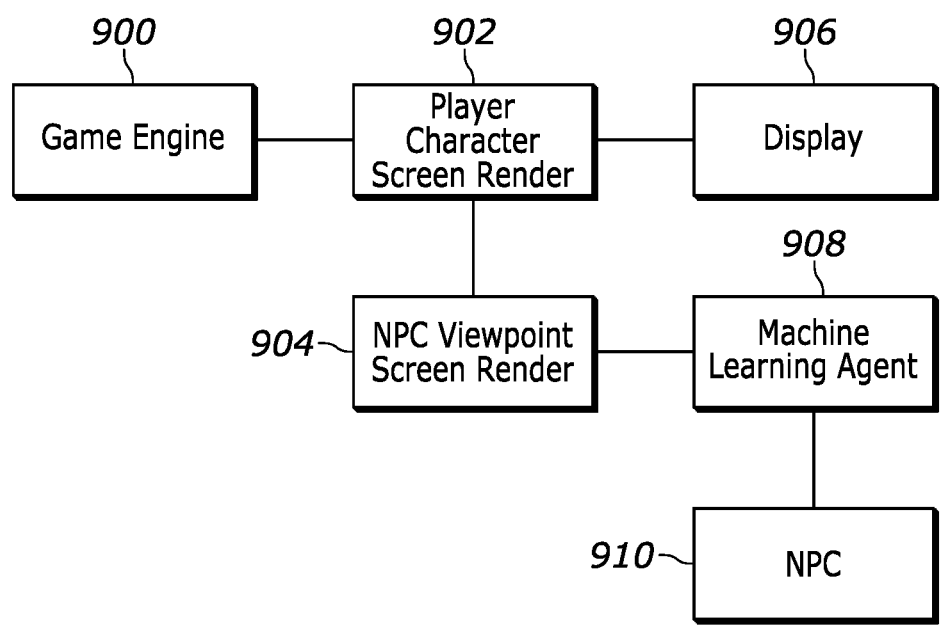
FIG. 9 illustrates an alternative architecture in which a game engine generates multiple screen renders.

FIG. 9 illustrates an alternate embodiment in which a game engine 900 generates both a player character screen render 902 and a NPC viewpoint screen render 904. The player character screen render 902 is presented on a display 906. The NPC viewpoint screen render 904 is input to a ML-implemented agent 908 which based on the NPC viewpoint screen render 904 controls a NPC 910.

While the particular embodiments are herein shown and described in detail, it is to be understood that the subject matter which is encompassed by the present invention is limited only by the claims.

What is claimed is:

1. An apparatus, comprising:
at least one computer storage that is not a transitory signal and that comprises instructions executable by at least one processor to:
generate a first screen render from a first viewpoint, the first viewpoint being of a first character, the first character being a player's character;
input the first screen render to at least one machine learning (ML) model;
receive from the ML model at least one transform of the first screen render, the transform comprising at least a second screen render from a second viewpoint, the second viewpoint being of a non-player character (NPC); and
input the second screen render to a ML-implemented agent controlling the NPC, or present on at least one display the second screen render, or both input the second screen render to a ML-implemented agent controlling the NPC and present on at least one display the second screen render.

2. The apparatus of claim 1, wherein the first and second screen renders comprise respective first and second game videos.

3. The apparatus of claim 1, wherein the ML model is trained using game images captured during a human play session.

4. The apparatus of claim 1, wherein the instructions are executable to avoid rendering multiple viewpoints simultaneously at least in part by:
rendering a single viewpoint;
using the ML model, transforming the single viewpoint to output video at viewpoints of one or more other NPCs in the area in a single inference pass.

5. The apparatus of claim 1, wherein the first screen render is sent from a cloud server to at least one display for presentation of the first screen render at a first time and actions of NPCs are delayed for at least one frame while the ML model generates the second screen render.

6. The device of claim 1, comprising the at least one processor programmed with the instructions.

7. The apparatus of claim 1, wherein the instructions are executable to:
input the second screen render to a ML-implemented agent controlling the NPC; and
execute the ML-implemented agent to control the NPC.

8. A method, comprising:
inputting, to at least one machine learning (ML) model, at least a player character (PC) video stream of at least one computer simulation;
receiving, from the ML model, at least one non-player character (NPC) video stream for the computer simulation;
presenting the PC video stream on at least one video display; and
inputting the NPC video stream to a ML-implemented agent controlling the NPC, wherein the method comprises avoiding rendering multiple viewpoints simultaneously at least in part by;
inputting only the PC video stream to the ML model; and
using the ML model, transforming the PC video stream to output the NPC video stream.

9. The method of claim 8, comprising presenting the PC video stream on a player display and presenting the NPC video stream on a video display other than the player display.

10. The method of claim 8, comprising inputting information related to one or more NPCs to the ML model.

11. The method of claim 10, wherein the information related to one or more NPCs comprises geometric information indicating a virtual spatial relationship between at least one NPC and at least one player character.

12. The method of claim 8, comprising training the ML model using game images captured during a human play session.

13. The method of claim 8, comprising
transforming the PC video stream to output the NPC video stream in a single inference pass.

14. The method of claim 8, comprising:

sending the PC video stream from a cloud server to at least one display for presentation of the PC video stream at a first time; and delaying actions of NPCs for at least one frame while the ML model generates the NPC video stream.

15. An apparatus, comprising:

at least one processor configured to:

generate, using computer simulation video techniques, a first video from a viewpoint of a first character controllable by a player;

present the first video on at least one display;

input the first video to at least one machine learning (ML) model and not input a second video from a viewpoint of a second character not controllable by a player to the ML model;

receive from the ML model at least the second video from the viewpoint of the second character not controllable by a player; and use the second video to control the second character not controllable by a player.

16. The apparatus of claim 15, wherein the processor is configured to:

present the first and second videos on respective first and second displays.

17. The apparatus of claim 15, wherein the processor is configured to:

input information related to one or more NPCs to the ML model.

18. The apparatus of claim 17, wherein the information related to one or more NPCs comprises geometric information indicating a virtual spatial relationship between at least one NPC and at least one player character.

19. The apparatus of claim 15, wherein the processor is configured to:

render the first video as a single video;

using the ML model, transform the single video plural NPC videos in a single inference pass.

20. The apparatus of claim 15, wherein the processor is configured to:

send the first video from a cloud server to at least one display for presentation of the first video at a first time; and delay actions of NPCs for at least one frame while the ML model generates the second video.

\* \* \* \* \*

UNITED STATES PATENT AND TRADEMARK OFFICE
CERTIFICATE OF CORRECTION

| | | |
|---|---|---|
| PATENT NO. | : 12,318,693 B2 | Page 1 of 1 |
| APPLICATION NO. | : 17/810556 | |
| DATED | : June 3, 2025 | |
| INVENTOR(S) | : Michael Taylor et al. | |

It is certified that error appears in the above-identified patent and that said Letters Patent is hereby corrected as shown below:

In the Claims

In Column 10, Line 48 (approx.), In Claim 8, delete "by;" and insert --by:--.

Signed and Sealed this
Twenty-eighth Day of October, 2025

John A. Squires
*Director of the United States Patent and Trademark Office*